(12) United States Patent
Otterstedt et al.

(10) Patent No.: US 9,093,128 B2
(45) Date of Patent: Jul. 28, 2015

(54) ELECTRONIC DEVICE WITH A PLURALITY OF MEMORY CELLS AND WITH PHYSICALLY UNCLONABLE FUNCTION

(71) Applicant: Infineon Technologies AG, Neubiberg (DE)

(72) Inventors: Jan Otterstedt, Unterhaching (DE); David Müller, Unterhaching (DE)

(73) Assignee: Infineon Technologies AG, Neubiberg (DE)

( * ) Notice: Subject to any disclaimer, the term of this patent is extended or adjusted under 35 U.S.C. 154(b) by 335 days.

(21) Appl. No.: 13/668,963

(22) Filed: Nov. 5, 2012

(65) Prior Publication Data

US 2014/0126306 A1     May 8, 2014

(51) Int. Cl.
*G11C 7/06*     (2006.01)
*H04L 9/32*     (2006.01)
*H04L 9/08*     (2006.01)
*G11C 16/22*     (2006.01)
*H04L 29/06*     (2006.01)

(52) U.S. Cl.
CPC ........ *G11C 7/06* (2013.01); *G11C 16/22* (2013.01); *H04L 9/0841* (2013.01); *H04L 9/3263* (2013.01); *H04L 63/0823* (2013.01)

(58) Field of Classification Search
CPC ........ G11C 7/06; G11C 16/22; H04L 9/0841; H04L 9/3263; H04L 63/0823
USPC .............. 365/189.07, 195, 196; 711/217, 711/E12.078; 714/768, E11.034
See application file for complete search history.

(56) References Cited

U.S. PATENT DOCUMENTS

| | | | |
|---|---|---|---|
| 2011/0103161 A1* | 5/2011 | Tuyls et al. | 365/189.16 |
| 2011/0215829 A1 | 9/2011 | Guajardo Merchan et al. | |
| 2011/0317829 A1 | 12/2011 | Ficke et al. | |
| 2012/0020145 A1 | 1/2012 | Huber et al. | |
| 2012/0066571 A1 | 3/2012 | Marinet | |
| 2012/0106235 A1 | 5/2012 | Christensen et al. | |
| 2013/0185611 A1* | 7/2013 | Goettfert et al. | 714/766 |

FOREIGN PATENT DOCUMENTS

EP     2230793 A2     9/2010

* cited by examiner

*Primary Examiner* — Toan Le
(74) *Attorney, Agent, or Firm* — Murphy, Bilak & Homiller, PLLC

(57) ABSTRACT

An electronic device includes a non-volatile memory having a plurality of memory cells, a memory controller, and an evaluator. The memory controller is configured to provide control signals to the non-volatile memory causing the non-volatile memory, or a selected memory section of the non-volatile memory, to be in one of a read state and a weak erase state, wherein the weak erase state causes the plurality of memory cells to maintain different states depending on different physical properties of the plurality of memory cells. The evaluator is configured to read out the plurality of memory cells and to provide a readout pattern during the read state, wherein the readout pattern that is provided after a preceding weak erase state corresponds to a physically unclonable function (PUF) response of the electronic device uniquely identifying the electronic device.

31 Claims, 14 Drawing Sheets

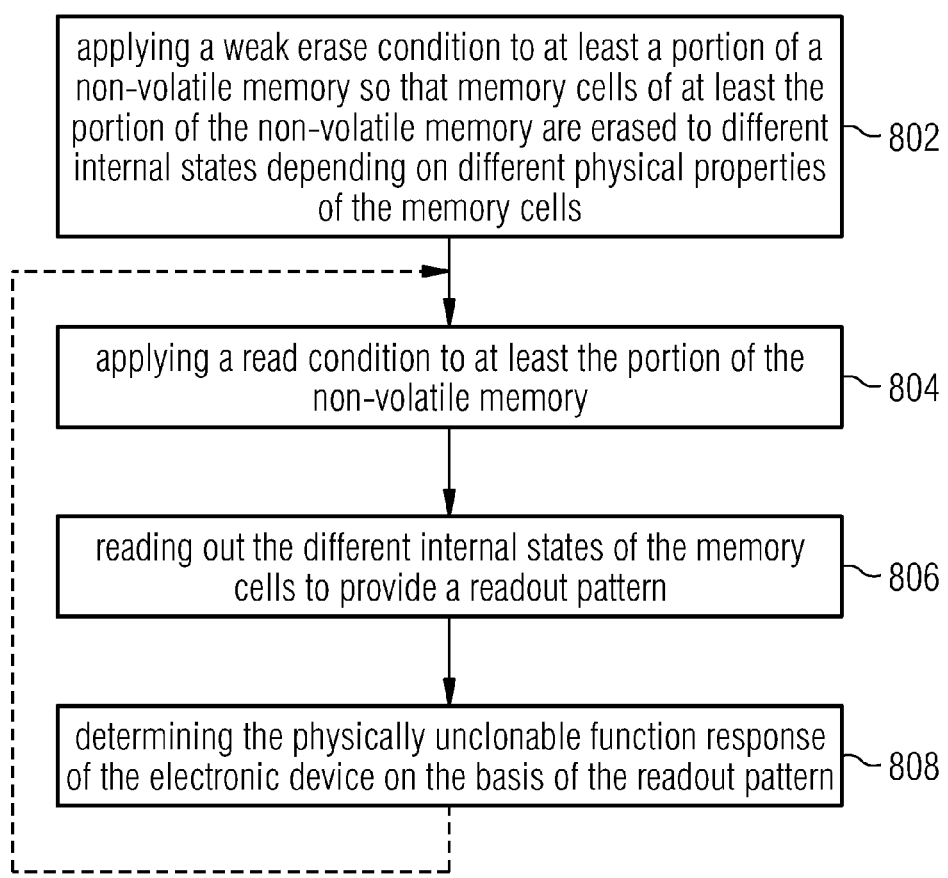

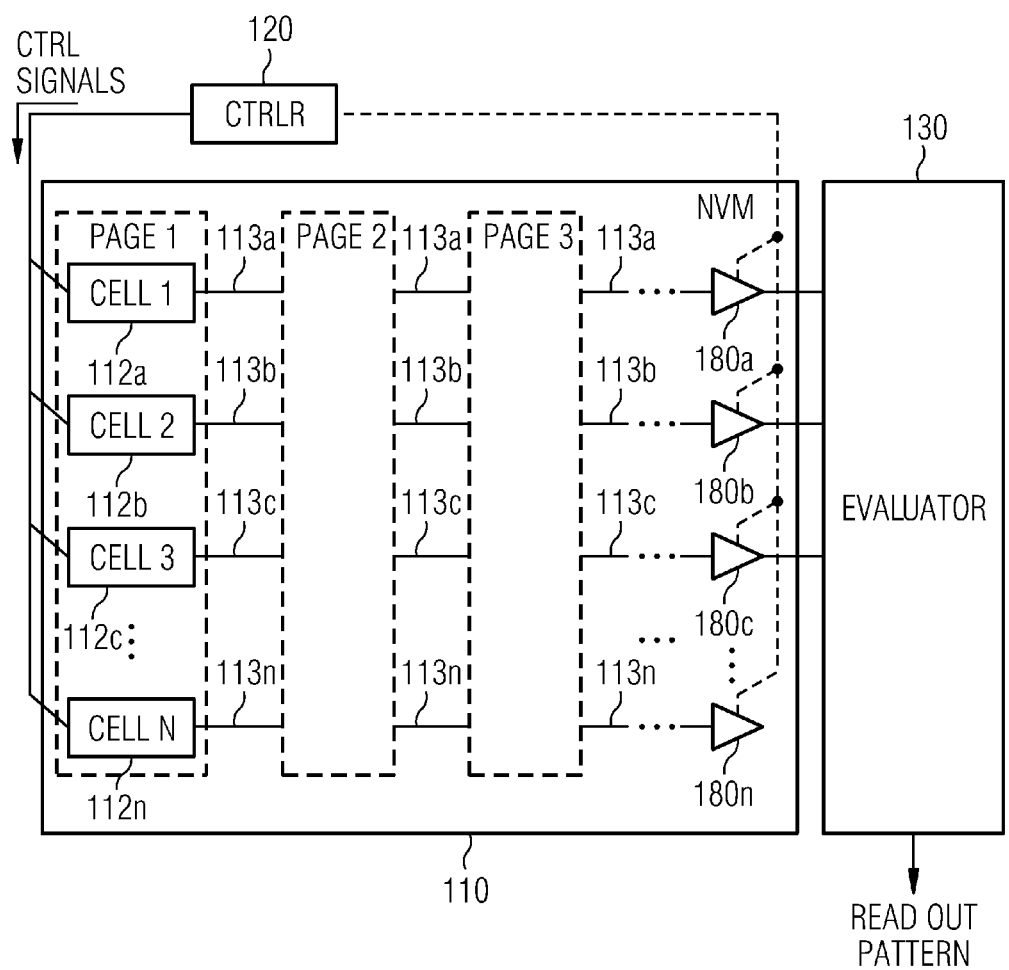

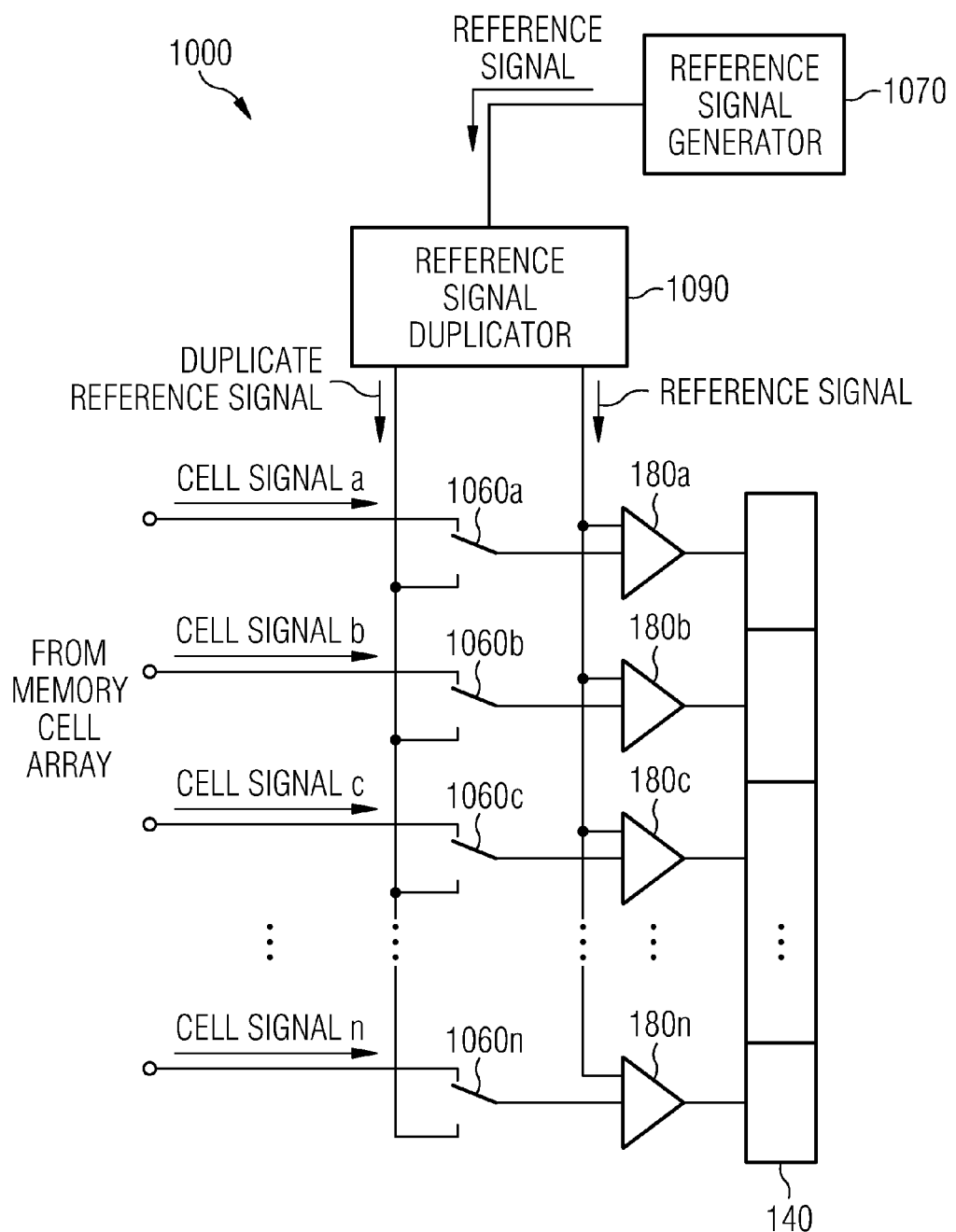

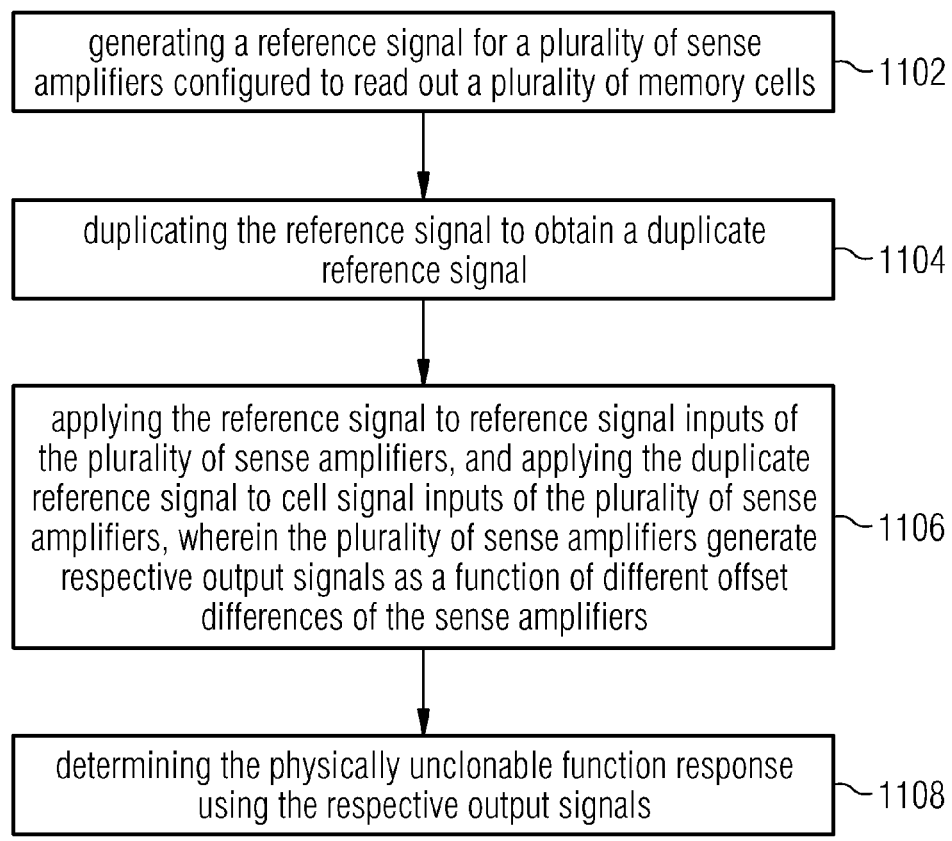

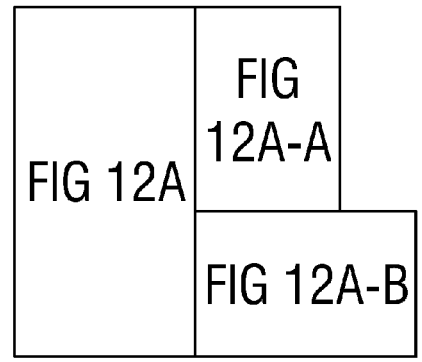
FIG 12A-A
| BITLINE | PAGE PAIR 1 | PAGE PAIR 2 | PAGE PAIR 3 | PAGE PAIR 4 | PAGE PAIR 5 | PAGE PAIR 6 | PAGE PAIR 7 | PAGE PAIR 8 | PAGE PAIR 9 | PAGE PAIR 10 | PAGE PAIR 11 | PAGE PAIR 12 | PAGE PAIR 13 | PAGE PAIR 14 | PAGE PAIR 15 | PAGE PAIR 16 | PAGE PAIR 17 | PAGE PAIR 18 |
|---|---|---|---|---|---|---|---|---|---|---|---|---|---|---|---|---|---|---|
| 2188 | -1 | -1 | -1 | -10 | -18 | 4 | 24 | 3 | -1 | -3 | -7 | 1 | 6 | 0 | -8 | 10 | 2 | -1 |
| 2189 | -10 | 1 | -6 | 7 | 18 | -13 | -4 | -1 | 0 | 10 | 1 | 1 | -13 | 3 | 9 | -1 | 0 | 1 |
| 2190 | 12 | -3 | -17 | -4 | 11 | 0 | 7 | 5 | -6 | -9 | -7 | 6 | 6 | 5 | 3 | 0 | 2 | -10 |
| 2191 | 0 | -4 | -5 | -2 | -2 | 1 | 12 | 7 | -6 | -7 | -1 | 1 | -1 | 4 | -7 | 3 | 5 | 0 |
| 2192 | -3 | -3 | -2 | 3 | 6 | -6 | -4 | 3 | -4 | 1 | 4 | -6 | -1 | 3 | 9 | 3 | -9 | 2 |
| 2193 | -6 | 1 | 2 | 6 | 2 | -13 | -2 | 10 | -5 | 3 | 0 | 0 | 10 | -11 | 2 | -2 | -1 | 3 |
| 2194 | 9 | 2 | -7 | -8 | -2 | 13 | 4 | -1 | -5 | 6 | 5 | -3 | 2 | -13 | -5 | 17 | 4 | -11 |
| 2195 | -9 | -6 | 3 | 3 | 10 | -2 | 0 | 1 | -8 | 7 | 0 | 0 | -4 | 2 | 3 | -6 | 7 | 4 |
| 2196 | -11 | 20 | 3 | 0 | 1 | -1 | 4 | 1 | -7 | -8 | 10 | 3 | -5 | 1 | -6 | 1 | 1 | -3 |
| 2197 | -7 | -6 | 0 | -11 | 2 | 17 | -1 | 0 | -9 | -5 | 11 | 5 | -10 | 10 | 12 | 2 | -6 | 1 |
| 2198 | -16 | 3 | 15 | 3 | 8 | 1 | -9 | 2 | -4 | -1 | -2 | 2 | 7 | -5 | -5 | -1 | 1 | 6 |
| 2199 | 6 | -7 | 5 | 15 | -2 | -12 | -1 | 4 | -1 | -1 | 2 | 8 | -9 | -7 | 10 | 8 | -2 | -8 |
| 2200 | 0 | 10 | 0 | -6 | -1 | 6 | 5 | 2 | 1 | -3 | 1 | 3 | -13 | -6 | -7 | 6 | 19 | -16 |
| 2201 | -18 | -6 | 7 | 6 | 10 | -6 | -18 | -3 | 19 | 9 | -16 | 0 | 5 | -3 | -11 | -1 | -18 | 3 |
| 2202 | 3 | -2 | -10 | -2 | -2 | -5 | 3 | -1 | 2 | 7 | -6 | 3 | 7 | -6 | -3 | 0 | -14 | 2 |
| 2203 | -3 | 9 | 0 | -5 | 1 | 0 | -3 | -3 | -4 | -17 | 5 | 22 | -4 | 1 | 5 | -2 | -4 | -6 |
| 2204 | 2 | 9 | -18 | 1 | 15 | -8 | 3 | 7 | -4 | -4 | 8 | 3 | 6 | -3 | -12 | 0 | 12 | -1 |
| 2205 | 11 | -1 | 4 | -1 | -8 | 2 | 9 | 0 | -9 | -1 | 11 | 1 | -8 | 0 | 9 | -7 | -3 | 6 |
| 2206 | 9 | 7 | -5 | 0 | -8 | -1 | 8 | 7 | 0 | -14 | -3 | 0 | 4 | 2 | -12 | 8 | 5 | -9 |
| 2207 | 1 | -7 | 0 | 6 | -9 | 6 | 1 | -9 | 5 | 11 | -9 | -3 | 6 | -5 | -13 | 2 | 16 | 6 |
| 2208 | 3 | 0 | -1 | -7 | 1 | 7 | 2 | -19 | -16 | 17 | 16 | -3 | -11 | 4 | 9 | 1 | 2 | -1 |

ABS(I1-I3)≥10μA

| | | | | | | | | | | | | | | |
|---|---|---|---|---|---|---|---|---|---|---|---|---|---|---|
| #≥10μA | 253 | 205 | 264 | 191 | 256 | 242 | 230 | 230 | 245 | 209 | 248 | 224 | 255 | 235 | 272 | 198 | 264 | 227 |
| #≤-10μA | 281 | 180 | 268 | 231 | 231 | 209 | 273 | 207 | 244 | 213 | 231 | 249 | 260 | 185 | 238 | 261 | 212 |
| TOTAL 467 | 534 | 385 | 532 | 422 | 487 | 451 | 503 | 437 | 489 | 422 | 479 | 473 | 515 | 420 | 533 | 436 | 525 | 439 |
| | 24% | 17% | 24% | 19% | 22% | 20% | 23% | 20% | 22% | 19% | 22% | 21% | 23% | 19% | 24% | 20% | 24% | 20% |
| 21% | 47% | 53% | 50% | 45% | 53% | 54% | 46% | 53% | 50% | 50% | 52% | 47% | 50% | 52% | 56% | 51% | 45% | 50% | 52% |
| 50% | | | | | | | | | | | | | | | |

ABS(I1-I3)≥15μA

| | | | | | | | | | | | | | | |
|---|---|---|---|---|---|---|---|---|---|---|---|---|---|---|
| #≥15μA | 77 | 61 | 82 | 55 | 89 | 60 | 82 | 61 | 80 | 86 | 48 | 77 | 67 |
| #≤-15μA | 81 | 47 | 90 | 61 | 116 | 82 | 71 | 126 | 72 | 57 | 65 | 55 | 59 | 82 | 74 | 44 | 96 | 55 | 79 | 67 |
| TOTAL 140 | 158 | 198 | 172 | 116 | 164 | 147 | 126 | 161 | 119 | 145 | 135 | 124 | 182 | 103 | 156 | 134 |
| | 7% | 5% | 8% | 7% | 5% | 7% | 6% | 5% | 7% | 7% | 6% | 6% | 8% | 5% | 7% | 6% |
| 6% | 49% | 56% | 48% | 47% | 50% | 49% | 47% | 50% | 44% | 55% | 50% | 57% | 45% | 65% | 47% | 49% | 50% |
| 50% | | | | | | | | | | | | | | | |

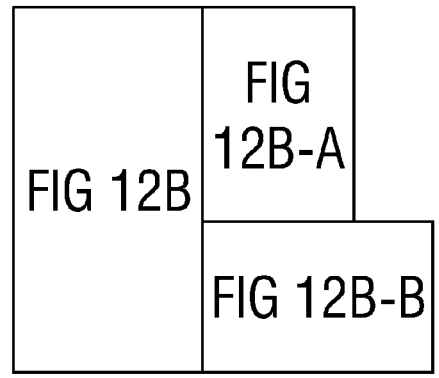
FIG 12B-A
| BITLINE | PAGE PAIR 19 | PAGE PAIR 20 | PAGE PAIR 21 | PAGE PAIR 22 | PAGE PAIR 23 | PAGE PAIR 24 | PAGE PAIR 25 | PAGE PAIR 26 | PAGE PAIR 27 | PAGE PAIR 28 | PAGE PAIR 29 | PAGE PAIR 30 | PAGE PAIR 31 | PAGE PAIR 32 | PAGE PAIR 33 | PAGE PAIR 34 | PAGE PAIR 35 |
|---|---|---|---|---|---|---|---|---|---|---|---|---|---|---|---|---|---|
| 2188 | -2 | -1 | 6 | 3 | -6 | 0 | 1 | -15 | 3 | 8 | -10 | -1 | 2 | 1 | -3 | 2 | 2 |
| 2189 | -4 | -3 | 2 | -11 | 11 | 13 | -6 | -8 | 1 | 9 | -5 | -11 | -7 | 4 | 12 | 4 | -5 |
| 2190 | 1 | 2 | 0 | -5 | 13 | -6 | 5 | 15 | 13 | 3 | -5 | -7 | 5 | -6 | -10 | 3 | 3 |
| 2191 | 7 | 0 | -5 | -8 | 8 | -4 | -2 | 7 | -6 | -2 | 3 | 0 | -2 | 3 | 12 | 1 | 0 |
| 2192 | 4 | -5 | 0 | 0 | 6 | -1 | -12 | 6 | 3 | -1 | -3 | -7 | 6 | 3 | -6 | 0 | 3 |
| 2193 | -5 | 7 | 3 | -7 | 0 | 8 | 13 | -10 | 12 | 5 | -1 | 4 | -1 | -3 | 11 | 6 | -14 |
| 2194 | 14 | 3 | 9 | -1 | 1 | 0 | -5 | 5 | 8 | 4 | -10 | -2 | 7 | -1 | 6 | 3 | -7 |
| 2195 | -3 | 10 | 5 | 0 | 10 | 0 | -1 | 2 | 7 | 10 | -11 | -3 | 12 | 3 | 14 | -5 | 3 |
| 2196 | -4 | 0 | 7 | -2 | -9 | -4 | 3 | -2 | 8 | 7 | 1 | -1 | 15 | 5 | 10 | -1 | 13 |
| 2197 | 1 | 1 | 9 | 4 | 1 | -2 | -8 | -4 | 3 | 4 | 5 | 4 | -7 | -5 | -3 | 2 | 0 |
| 2198 | 8 | -8 | 13 | 1 | 1 | 3 | 12 | -4 | 0 | 8 | -7 | -17 | -1 | 7 | 7 | 5 | -3 |
| 2199 | -8 | 5 | 14 | 3 | -3 | -3 | 4 | 2 | -13 | -4 | 7 | -8 | -5 | 6 | 9 | 7 | 3 |
| 2200 | -2 | 15 | 1 | 1 | -7 | -1 | 7 | -4 | 4 | -4 | -9 | -2 | -1 | 10 | 4 | -7 | 2 |
| 2201 | 13 | 1 | 18 | -1 | 12 | -7 | -1 | 2 | 5 | -1 | 4 | 7 | 12 | 0 | 7 | 0 | 4 |
| 2202 | 10 | -8 | -4 | 8 | 3 | 1 | 6 | -3 | -4 | 6 | 7 | 12 | -5 | 7 | 10 | -6 | 15 |
| 2203 | -4 | 7 | 9 | -3 | -1 | -6 | 6 | 4 | -4 | 4 | -6 | 0 | 6 | 4 | -3 | -1 | 1 |
| 2204 | -3 | 6 | 11 | -5 | 13 | -5 | -2 | 10 | -1 | 0 | 4 | -9 | -6 | 9 | 1 | -7 | -7 |
| 2205 | -8 | 1 | 3 | -2 | 8 | -1 | 0 | -5 | 26 | 4 | 14 | 0 | 3 | -1 | 2 | -2 | 2 |
| 2206 | 4 | 9 | 0 | 0 | 7 | 1 | -4 | 2 | 4 | -5 | -20 | 0 | 12 | 4 | -3 | -5 | 4 |
| 2207 | -1 | 0 | -5 | -4 | 7 | 4 | -2 | 10 | -1 | 9 | 5 | 1 | 3 | -4 | 0 | 0 | -7 |
| 2208 | -3 | -1 | -2 | 2 | -8 | -5 | 13 | 5 | 0 | -8 | -5 | 8 | -8 | -8 | 9 | 3 | 4 |

FIG 12B

| FIG 12B | FIG 12B-A |
|---|---|
| | FIG 12B-B |

FIG 12B-B

*ABS(I1-I3)≥10μA*

| | | | | | | | | | | | | | | | | |
|---|---|---|---|---|---|---|---|---|---|---|---|---|---|---|---|---|
| #≥10μA | 240 | 171 | 261 | 210 | 238 | 207 | 251 | 214 | 250 | 228 | 255 | 198 | 243 | 212 | 243 | 199 | 280 |
| #≤-10μA | 267 | 195 | 241 | 201 | 278 | 223 | 247 | 221 | 227 | 201 | 247 | 200 | 254 | 204 | 252 | 232 | 239 |
| | 507 | 366 | 502 | 411 | 516 | 430 | 498 | 435 | 477 | 429 | 502 | 398 | 497 | 416 | 495 | 431 | 519 |
| | 23% | 17% | 23% | 19% | 23% | 19% | 23% | 20% | 22% | 19% | 23% | 18% | 23% | 19% | 22% | 20% | 24% |
| | 21% | 47% | 47% | 52% | 51% | 46% | 48% | 50% | 49% | 52% | 53% | 51% | 50% | 49% | 51% | 49% | 46% | 54% |
| 467 | | | | | | | | | | | | | | | | | |
| 50% | | | | | | | | | | | | | | | | | |

*ABS(I1-I3)≥15μA*

| | | | | | | | | | | | | | | | | |
|---|---|---|---|---|---|---|---|---|---|---|---|---|---|---|---|---|
| #≥15μA | 73 | 62 | 84 | 54 | 70 | 60 | 88 | 67 | 80 | 58 | 84 | 49 | 73 | 59 | 73 | 60 | 88 |
| #≤-15μA | 81 | 57 | 83 | 51 | 76 | 58 | 85 | 53 | 64 | 60 | 74 | 53 | 72 | 57 | 81 | 64 | 77 |
| | 154 | 119 | 167 | 105 | 146 | 118 | 173 | 120 | 144 | 118 | 158 | 102 | 145 | 116 | 154 | 124 | 165 |
| | 7% | 5% | 8% | 5% | 7% | 5% | 8% | 5% | 7% | 5% | 7% | 5% | 7% | 5% | 7% | 6% | 7% |
| | 6% | 47% | 52% | 50% | 51% | 48% | 51% | 56% | 56% | 49% | 53% | 48% | 50% | 51% | 47% | 48% | 53% |
| 140 | | | | | | | | | | | | | | | | | |
| 50% | | | | | | | | | | | | | | | | | |

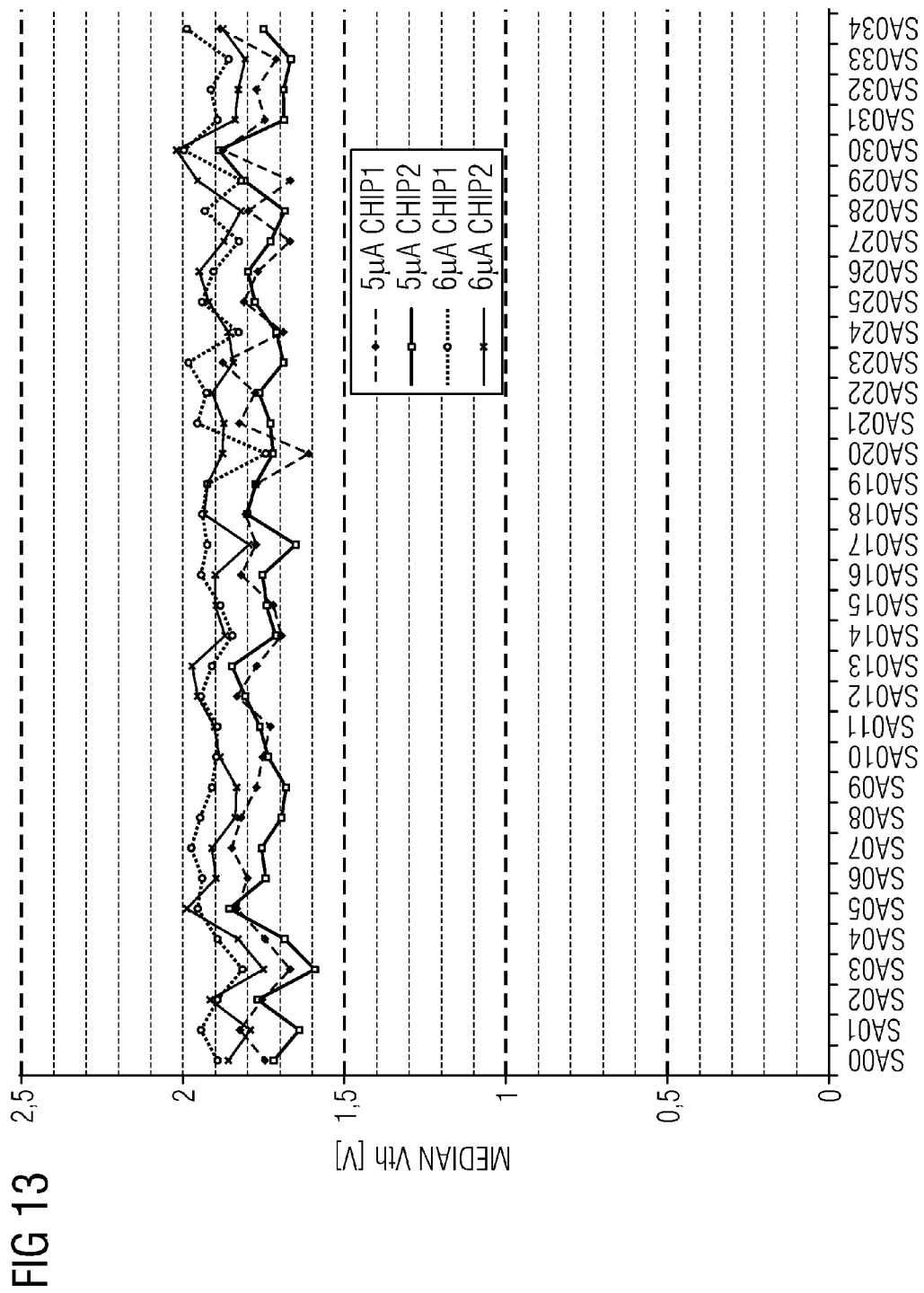

ELECTRONIC DEVICE WITH A PLURALITY OF MEMORY CELLS AND WITH PHYSICALLY UNCLONABLE FUNCTION

TECHNICAL FIELD

Embodiments of the present invention relate to an electronic device comprising a non-volatile memory. Further embodiments of the present invention relate to an electronic device comprising a plurality of sense amplifiers configured to read out a plurality of memory cells. Further embodiments of the present invention relate to a method for generating a physically unclonable function (PUF) response of an electronic device. Further embodiments of the present invention relate to a PUF functionality based on non-volatile memory (NVM) behavior.

BACKGROUND

The so called PUFs (Physically Unclonable Functions) are used to generate a secret key from physical properties of a chip, which randomly differ from chip to chip. This secret key is not stored on the chip (e.g. in an NVM), but is re-generated (at least) every time the chip is powered up. So a reverse engineering of the structure or memory content of a chip cannot reveal this key, since it is not existing in the un-powered chip. The realization of a PUF can be based on specially designed hardware, or can make use of the properties of anyway existing circuitry, that is randomly varying between chips. The main problem for the realization of a PUF lays in the error probability for the bits, when a key is re-generated under different conditions (different temperature, voltage, . . . ). The higher the error probability, the higher the effort for the correct recovery of the key becomes. Above a certain error probability no key recovery is possible. Various methods to handle the error probability during key recovery are known from other PUF implementations and are not part of this discussion.

Some conventional solutions employ specifically designed and implemented PUF hardware which typically make it possible to achieve low bit error probabilities. Accordingly, a relatively small effort for a downstream error correction is required. However, such dedicated PUF hardware needs to be specially implemented on a chip and thus needs extra area. The PUF hardware also needs to be implemented on every chip of a series, even if only a few chips need a physically unclonable function. For the chips that do not need a PUF, this results in wasted area.

Hence, it is desired to provide a concept which reduces the amount of specially designed and implemented PUF and/or allow the use of general purpose hardware on a chip for generating a PUF response.

SUMMARY

Embodiments of the present invention relate to an electronic device comprising a non-volatile memory, a memory controller and an evaluator. The non-volatile memory comprises a plurality of memory cells. The memory controller is configured to provide control signals to the non-volatile memory causing the non-volatile memory, or a selected memory section of the non-volatile memory, to be in one of a read state and a weak erase state. The weak erase state causes the plurality of memory cells to maintain different states depending on different (randomly varying) physical properties of the plurality of memory cells. The evaluator is configured to read out the plurality of memory cells and to provide a readout pattern during the read state. The readout pattern that is provided after a preceding weak erase state corresponds to a physically unclonable function response (PUF response) of the electronic device. The PUF response can be used to uniquely identify the electronic device.

Further embodiments of the present invention relate to an electronic device comprising a plurality of sense amplifiers, a reference signal generator, a reference signal duplicator and a plurality of input selectors. The plurality of sense amplifiers is configured to read out a plurality of memory cells by comparing a cell signal output by one of the plurality of memory cells with a reference signal. The reference signal generator is configured to generate the reference signal. The reference signal duplicator is configured to provide a duplicate reference signal. The plurality of input selectors is configured to selectively apply one of the cell signal and the duplicate reference signal to the plurality of sense amplifiers for comparison with the reference signal. The comparison of the duplicate reference signal with the reference signal by the plurality of sense amplifiers produces a physically unclonable function (PUF) response of the electronic device. The physically unclonable function (PUF) response reflects offset differences of the plurality of sense amplifiers.

Further embodiments of the present invention relate to an electronic device comprising a means for storing data, a means for controlling an operating state of the means for storing data, and a means for reading out the internal state of the means for storing data. The means for storing data provides at least a read state and a weak erase state as operating states controlled by the means for controlling the operating state. The weak erase state causes the means for storing data to maintain an internal state that is within a tolerance region of a characteristic internal state of the means for storing data. The means for reading out the internal state of the means for storing data is also configured to output a physically unclonable function (PUF) response on the basis of the internal state of the means for storing data.

Further embodiments of the present invention provide a method for generating a physically unclonable function (PUF) response of an electronic device. The method comprises applying a weak erase condition to at least a portion of a non-volatile memory (NVM) so that memory cells of at least the portion of the non-volatile memory are erased to different internal states depending on different physical properties of the memory cells. The method also comprises applying a read condition to at least the portion of the non-volatile memory. The different internal states of the memory cells are then read out to provide a readout pattern. The method further comprises determining the physically unclonable function response of the electronic device on the basis of the readout pattern.

Further embodiments of the present invention relate to a method for generating a physically unclonable function response of an electronic device. The method comprises generating a reference signal for a plurality of sense amplifiers configured to read out a plurality of memory cells. The reference signal is then duplicated to obtain a duplicate reference signal. The method further comprises applying the reference signal to reference signal inputs of the plurality of sense amplifiers, and applying the duplicate reference signal to cell signal inputs of the plurality of sense amplifiers. The plurality of sense amplifiers generate respective output signals as a function of the different offset differences of the sense amplifiers. The physically unclonable function response is then determined using the respective output signals of the plurality of sense amplifiers.

BRIEF DESCRIPTION OF THE FIGURES

Embodiments of the present invention will be described in detail using the accompanying figures, in which:

FIG. 8 shows a schematic flow diagram of a method for generating a physically unclonable function response according to some embodiments;

FIG. 9 shows a schematic block diagram of an electronic device according to further embodiments;

FIG. 10 shows a schematic block diagram of an electronic device according to further embodiments that uses the random differences within a plurality of sense amplifiers for generating a PUF response;

FIG. 11 shows a schematic flow diagram of a method for generating a physically unclonable function response according to further embodiments;

FIGS. 12A and 12B show measurement results that demonstrate that the random differences between the memory cells in a NVM can be used to generate PUF responses;

FIG. 13 illustrates the different behavior of different sense amplifiers implemented on different chips but at corresponding positions within the different chips.

DETAILED DESCRIPTION

Before embodiments of the present invention are described in detail using the accompanying figures, it is to be pointed out that the same elements or functionally equal elements are provided with the same reference numbers and that a repeated description for elements having the same reference numbers is omitted.

Figure 1:
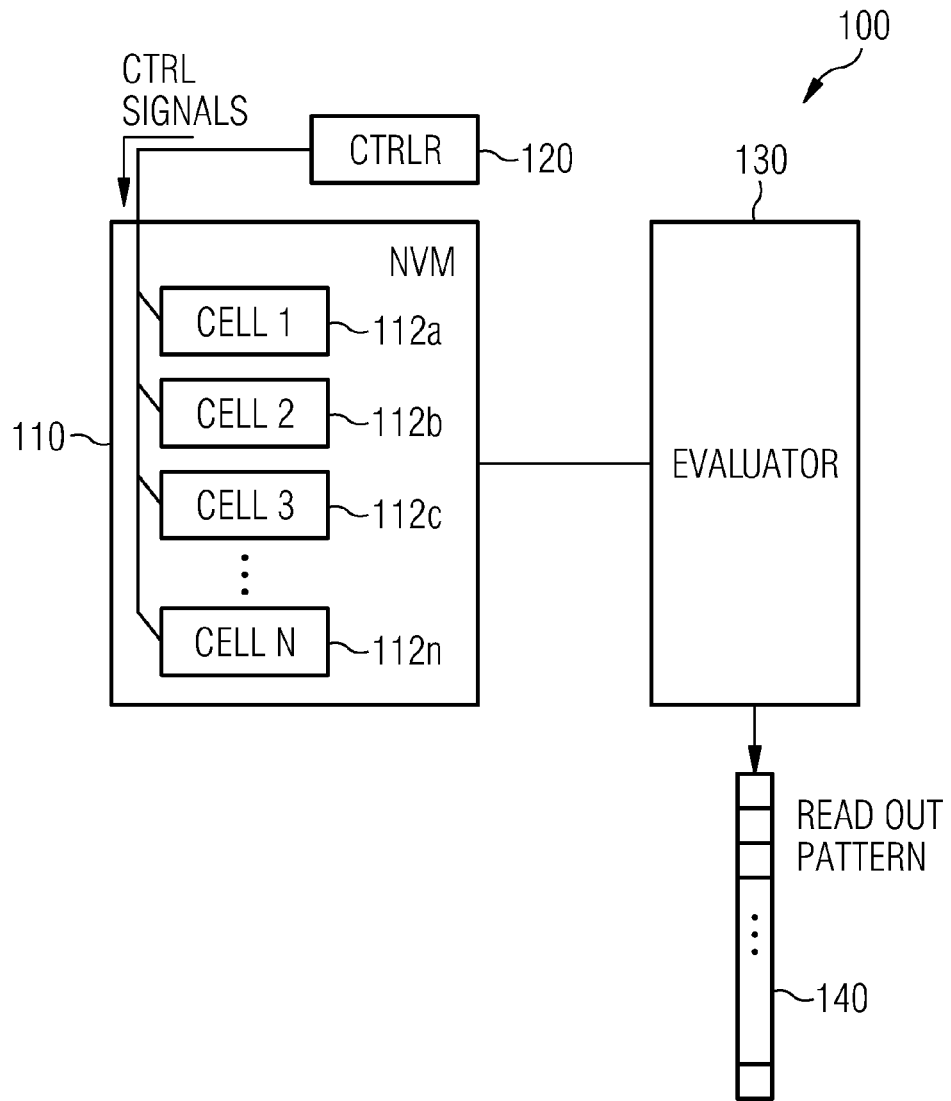
FIG. 1 shows a schematic block diagram of an electronic device that uses random variations of the physical properties of memory cells in a non-volatile memory for generating a PUF response.

FIG. 1 shows a schematic block diagram of an electronic device 100 or a portion thereof that comprises a non-volatile memory (NVM) 110 with a plurality of memory cells 112a, 112b, 112c . . . 112n. The electronic device further comprises a memory controller (CTRLR) 120 which is configured to provide control signals (CTRL SIGNALS) to the non-volatile memory 110. The control signals are distributed to the memory cells 112a to 112n and define a current operating state for the plurality of memory cells. Typically, the memory cells 112a to 112n provide at least two operating states: a read state and a weak erase state. The electronic device further comprises an evaluator 130 that is connected to the plurality of memory cells 112a to 112n. The evaluator 130 is configured to read out the plurality of memory cells 112a to 112n and to provide a readout pattern 140 during the read state of the non-volatile memory 110. The readout pattern 140 that is provided after a preceding weak erase state corresponds to a physically unclonable function response (PUF response) of the electronic device 100 which uniquely identifies the electronic device 100. The readout pattern 140 may undergo some further processing at the end of which the corresponding PUF response is obtained.

The proposed PUF response generation makes use of the properties and behavior of the NVM 110 that already exists or is required on many chips like microprocessors and microcontrollers used for chip card applications, automotive applications and many other applications. Two properties of the NVM 110 that may be employed, because they vary from chip to chip, but are otherwise quite stable, are:

Fluctuations in the physical properties of the NVM memory cells 112a to 112n themselves (especially like the TOX (Tunnel OXide) thickness), which can be determined by reading these cells under certain conditions or procedures. These conditions and/or procedures necessarily differ from the normally employed operating states of the NVM 110, because normally the fluctuations must not have an influence on the behavior of the NVM 110. This option and several variants thereof are illustrated in FIGS. 1 to 7 and explained in the corresponding description.

Another option is to use the offsets of the sense amplifiers that are present in a solid state memory and which are subject to random variations of their physical properties. FIGS. 9 to 11 schematically illustrate corresponding electronic devices and methods for generating a PUF response.

Instead of using a non-volatile memory, a conventional solution is to make use of the reset value of a random access memory (RAM). Since the RAM exists anyway, no extra hardware is required for the PUF (or at least only a small amount of additional hardware). The PUF functionality may be implemented in software ("software PUF") so that it may be implemented only on the chips that need a PUF. However, reset values of RAM bits are influenced by environmental conditions (and even by the last state at power down and the time since power-down). This may lead to rather high error rates. Another drawback with RAM-based PUFs is that typically a large amount of RAM bits needs to be evaluated so that complicated algorithms and high software effort (code size and run time) are needed for PUF response recovery (which may be used for a subsequent key generation, i.e., for key recovery).

The electronic device 100 systematically illustrated in block diagram formed in FIG. 1 may be operated as follows.

The following actions may be performed once as a preparation of the PUF area, for example during an enrollment phase in which a reference readout pattern for the electronic device at hand is determined (also referred to as "step 1" below).

Reserve one range of NVM cells, preferably one NVM memory page (=wordline) or a portion of an NVM page.

Fully write all bits of the range to remove any pre-existing information content of the cells.

Erase all bits of the range (e.g. erase the page) to a weakly erased state (i.e. typically not a full erase as used in the normal application, which would make the following evaluation of the cells harder than necessary.)

All cells are nominally erased to the same state, but in reality the states differ slightly depending on the physical properties of the involved NVM cells.

Optionally: Determine the read conditions (like read voltage and reference current) that yield approximately 50% bit value='1' and 50% bit value='0', when reading the NVM cell range. Store these conditions chip-internally or externally.

Figure 2:
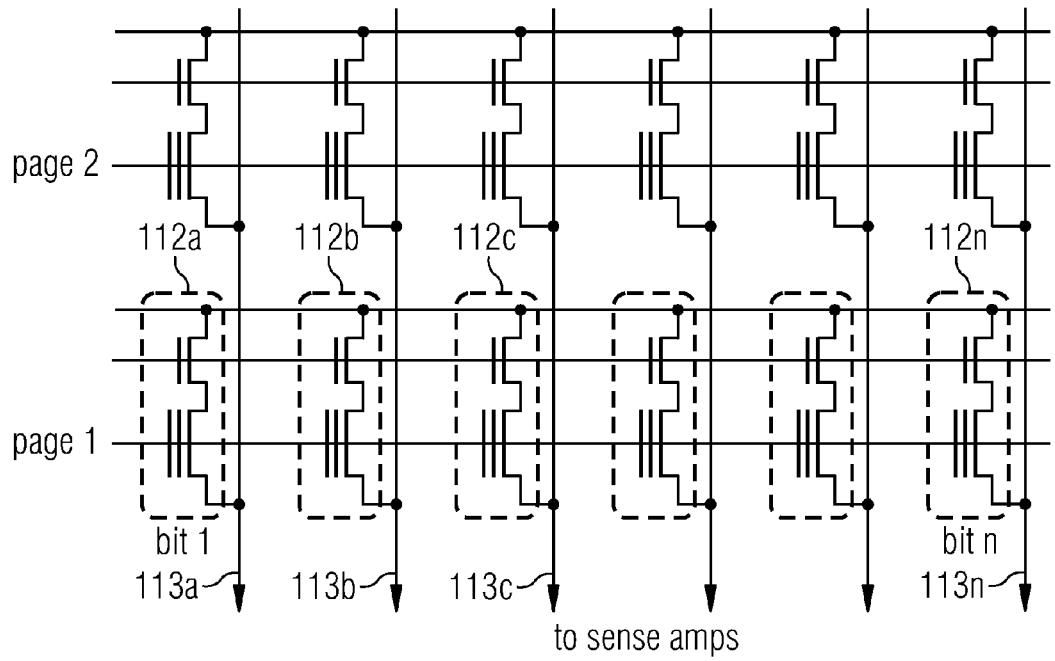
FIG. 2 shows a schematic circuit diagram of a portion of a NVM of an electronic device according to some embodiments.

FIG. 2 shows a schematic circuit diagram of a portion of a memory cell field with the range of cells in the reserved page 1 marked by dashed boxes. The memory cells may be, for example, 2T cells (two-transistor cells) like HS3P (Hot Source Triple Poly) or 2T-UCP (2-Transistor Uniform Channel Program). The memory cells $112a$ to $112n$ are connected to a plurality of bitlines $113a$ to $113n$ which lead to sense amplifiers (not illustrated in FIG. 2).

Figure 3:
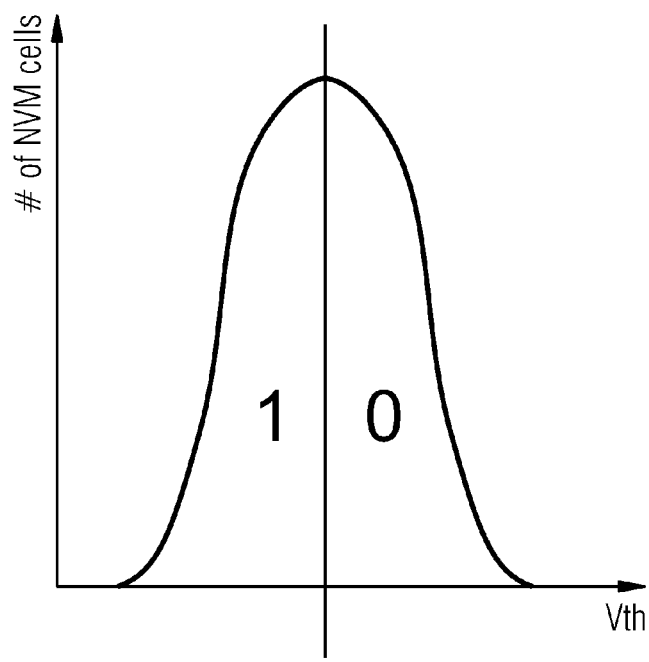
FIG. 3 illustrates a statistical distribution of output values of a plurality of NVM cells over a threshold voltage Vth.

FIG. 3 illustrates a statistical distribution of the threshold voltage Vth for a plurality of NVM cells at which the individual memory cells $112a$ to $112n$ changes its readout value from binary "one" to binary "zero". The memory cells $112a$ to $112n$ are, however, not limited to being binary memory cells but could also be ternary memory cells or memory cells supporting an even higher number of different memory readout values. In other words, FIG. 3 schematically illustrates the cell state distribution after (weak) erase, wherein the read condition is indicated by the orthogonal line separating the range where the memory read out value is "one" from the range in which the memory readout values is "zero". The cell state distribution has in the example illustrated in FIG. 3 approximately Gaussian shape, which may be assumed if the number of memory cells is sufficiently high. Nevertheless, other cells state distributions are also possible.

During a verification phase of a PUF application, the readout pattern and eventually the PUF response of the electronic device is regenerated every time the PUF response is needed. For example, the PUF response may be used as a cryptographic key which is needed to decrypt data that is stored in parts of the NVM 110 which are not used for the PUF functionality of the electronic device. Typically, the readout pattern that is generated during a verification phase is similar to the reference readout pattern, but nevertheless differs slightly from the reference readout pattern, in a mostly random manner. Different environmental conditions (temperature, supply voltage, etc.) may also cause differences between the reference readout pattern (generated during the enrollment phase) and a readout pattern generated during a verification phase. These differences can typically be corrected using error correction techniques.

The following actions may be performed every time the readout pattern has to be (re-)generated (also referred to as "step 2"):

Option 1:

Set suitable predetermined read conditions or read conditions determined in step 1), which differ from the read conditions applied for normal operation of the NVM.

Readout all cells in the range and (re-)generate the key from the result.

Option 2:

In a loop try out different predetermined read conditions or slight variations of the read conditions determined in step 1), until approximately 50% bit='1' and 50%='0' are read.

Readout all cells in the range and (re-)generate the key from the result.

With electronic device 100 schematically illustrated in FIG. 1 and the corresponding PUF generation explained in connection with FIGS. 1 to 3, only a small range of NVM cells is necessary. Moreover, only small and simple effort is needed for the generation of the PUF bits. For option 1, no compensation of temperature variation effects or degradation over time, e.g., due to disturbing influences, is provided. In the case of option 2, only partial compensation of, for example, temperature variation effects or degradation over time is provided. This may lead to relatively high error rates which may be addressed by a relatively high effort for error correction.

Relatively high error rates may also be caused by changes of the content of other NVM cells connected to the same bitlines like the NVM cells reserved for PUF generation (changing main NVM content over time). Moreover, the randomness of the individual bits may be limited by sense amplifier offsets which systematically influence the measurement results. Again, these phenomena may be addressed by a relatively high effort for error correction.

Figure 4:
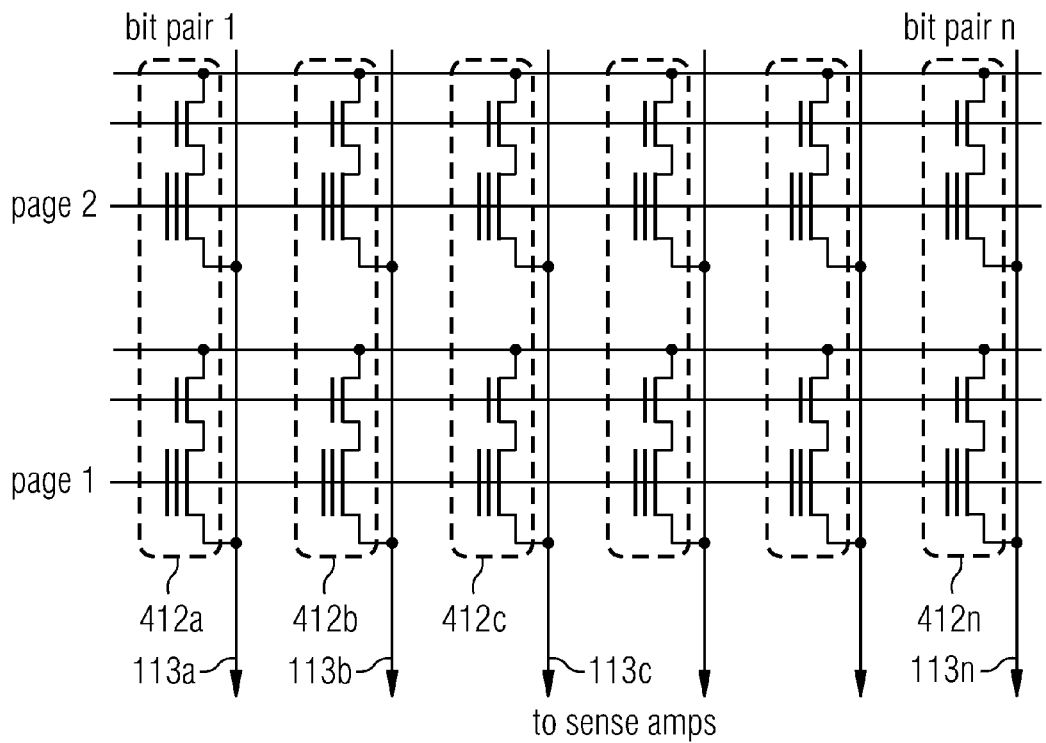
FIG. 4 shows a schematic circuit diagram of a portion of a NVM in which memory cells are paired to determine a readout pattern and eventually a PUF response.
Figure 5:
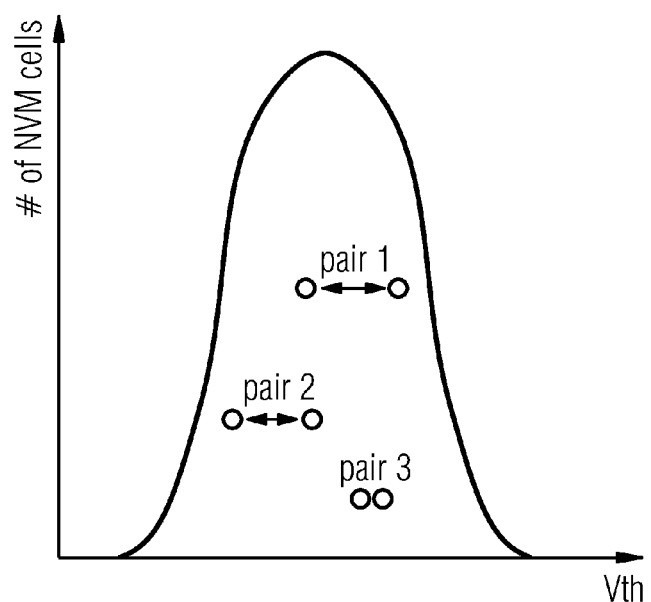
FIG. 5 illustrates a statistical distribution of the output values of the plurality of NVM cells over the threshold voltage Vth and also some examples of cell output values within pairs of memory cells.

FIGS. 4 and 5 relate to an electronic device according to further embodiments in which the focus is shifted from using only a small portion of the NVM to a reduced effort for error correction. To this end, the following actions may be performed once as a preparation of the PUF area, e.g., during the enrollment phase (step 1'):

Reserve two ranges of NVM cells connected to identical bitlines, preferably two NVM memory pages wordlines) or identical portions of two NVM pages.

Fully write all bits of the two ranges to remove any pre-existing information content of the cells.

Erase all bits of the two ranges (e.g. erase the two pages) to the same weakly erased state. This results in all cells of both ranges being nominally erased to the same state, but in reality the states differ slightly (in a random manner between individual specimen of the electronic device) depending on the physical properties of the involved NVM cells.

FIG. 4 shows a schematic circuit diagram of a portion of a NVM memory field with the range of cell pairs $412a$ to $412n$ in the reserved pages indicated by dashed boxes.

During the verification phase, the following actions may be performed every time the readout pattern (corresponding to the PUF response and/or, for example, a cryptographic key) has to be (re-)generated. Different predetermined read conditions may be tried out in a loop in an "increasing order" or a "decreasing order". For every bitline $113a$ to $113n$, the one of the two NVM cells that are connected to this same bitline is determined that switches earlier, i.e., changes its state earlier in the loop over the read conditions. After the loop is finished, the key may then be (re-)generated from the result. The loop may be finished when all predetermined read conditions have been tried out or, prematurely, when for every bitline $113a$ to $113n$ the earlier switching memory cell has already been determined and thus the memory readout value of the corresponding memory cell pair $412a$ to $412n$.

The concept of memory cell pairs may be generalized to memory cell groups comprising three or more memory cells.

The non-volatile memory 110 comprises a first memory section (e.g., page 1 in FIG. 4) and a second memory section (e.g., page 2 in FIG. 4). A first memory cell within the first memory section and a second memory cell within the second memory section form a memory cell pair, e.g. $412a$. Further memory cell pairs $412b$ to $412n$ are also illustrated in FIG. 4. The memory controller 120 is configured to vary the control signals for the non-volatile memory during the read state to provide different read conditions for the non-volatile memory 110. These different read conditions may be, for example, supply voltages or supply currents, bias voltages or bias currents, threshold voltages or threshold currents, etc., that are applied to the memory cells $112a$ to $112n$ and/or to sense amplifiers used for reading out the memory contents of the memory cells. The evaluator 130 is configured to determine which memory cell of the memory cell pair 412a to 412n exhibits a different memory readout value between a read condition and a subsequent read condition. The evaluator 130 is also configured to determine the readout pattern based on this determination of the order of the toggling of the memory cells in one memory cell pair 412a to 412n. Typically, the plurality of predetermined readout conditions are parsed by the memory controller 120 in an order that causes the memory cells to maintain their respective readout value up to a certain read condition and to maintain another readout value for the remaining read conditions. In other words, while parsing the different predetermined read conditions, the readout values of the individual memory cells typically follow a mathematically monotone behavior so that the readout value of a given memory cell does not return to a specific value it already had before. The expressions "first read condition" and "second read condition" are not to be construed to be necessarily the very first and very second read conditions but rather define an order of the first read condition and the second read condition. Typically, the second read condition will be immediately subsequent to the first condition but again this is not necessarily so, i.e., there could be one or more intermediate read conditions between the first read condition and the second read condition.

According to some embodiments, the first memory cell and the second memory cell may have identical layout and/or identical orientation. Thus, the first and second memory cells are more likely to react in the same manner to varying operating conditions such as temperature, magnetic field, radiation etc.

The memory controller 120 may be further configured to perform a plurality of iterations to vary the control signals for the non-volatile memory during the read state. The read conditions may be varied in a (mathematically) monotone sense from one iteration to a subsequent iteration. Note that the plurality of iterations may be performed during the enrollment phase of the electronic device and also during one or more verification phases of the electronic device. The evaluator 130 may be configured to determine which memory cell of the memory cell pair 412a to 412n changes its memory readout value at an earlier iteration than the other memory cell to obtain a corresponding memory cell order information. To illustrate this using FIG. 4, the memory cell order information may simply state whether in a given memory cell pair (e.g., memory cell pair 412c) the memory cell on page 2 changes its memory readout value earlier or the memory cell on page 1 changes its memory readout value earlier. In the former case, the memory cell order information may be a binary "zero" and in the latter case, the memory cell order information may be a binary "one", for example. The evaluator 130 may be further configured to determine the readout pattern on the basis of the memory cell order information. This and the evaluator 130 typically gathers and combines the individual memory cell order information provided by the individual memory cell pairs 412a to 412n. For example, the readout pattern may be a bit vector of the plurality of memory cell order information.

FIG. 5 illustrates the cell state distribution after (weak) erasure for three different cell pairs. It can be seen that the memory cells of pair 2 change their memory readout values at relatively low threshold voltages Vth, whereas the memory cells of pair 3 change their memory readout values at relatively high threshold voltages Vth. More interesting is, however, the fact that the memory cells in pair 1 change their memory readout values at notably different threshold voltages. Also, the memory cells in pair 2 change their respective memory readout values at clearly different threshold voltages. Memory cell pair 3 shows a different behavior: apparently the first memory cell and the second memory cell in pair 3 are so similar regarding their physical properties (e.g., tunnel oxide thickness) that their memory readout values change substantially at the same threshold voltage. As the two memory cells in memory cell pair 3 are so similar, it cannot be reliably guaranteed that the first memory cell always changes its memory readout value before the second memory cell or vice versa. Hence, pair 3 has a highly random behavior regarding its memory cell order information. It is also possible (or even very likely) that the first and second memory cells of memory cell pair 3 switch in the same loop step very often. In this case, no handling of pair 3 and further cell pairs exhibiting a similar behavior where both cells are switching in the same loop step is performed. These cell pairs typically go into the error rate. On the other hand, only a small range of NVM cells is necessary for embodiments using memory cell pairs. The software effort for the generation of PUF bits is still relatively small and simple, but higher than in the embodiments described in connection with FIGS. 2 and 3.

Taking the difference between two memory cells at the same bitline 113a to 113n is expected to strongly reduce the high error rates since the following effects are substantially automatically cancelled out:

Temperature variation effect (identical temperature of both cells).

Degradation over time, e.g., due to disturbances (seen in the same way by both cells).

Changes of the content of other NVM cells connected to the same bitlines 113a to 113n like the NVM cells reserved for PUF (seen in the same way by both cells).

Influence of sense amplifier offsets (since identical sense amplifier is used to read both cells).

Compared to the embodiments described in connection with FIGS. 2 and 3, a lowered effort for error correction may be expected when memory cell pairs or memory cell groups are used.

Embodiments will be described below in connection with FIGS. 6 and 7 that provide different options for handling indifferent memory cell pairs, such as pair 3 in FIG. 5. During an enrollment phase of the electronic device 100, the following actions are performed once as a preparation of the PUF area (similar or identical to what is described above):

Reserve two ranges of NVM cells connected to identical bitlines 113a to 113n, e.g., two NVM memory pages (=word lines) or identical portions of two NVM pages.

Fully write all bits of the two ranges to remove any pre-existing information content of the cells.

Erase all bits of the two ranges (e.g., erase the two pages) to the same weakly erased state. This results in all cells of both ranges being nominally erased to the same state, but in reality the states differ slightly depending on the physical properties of the involved NVM cells.

In a loop, different predetermined read conditions are tried out in an "increasing order", and for every bitline (i.e., for every memory cell pair) the one of the two NVM cells is determined that switches earlier, i.e., earlier changes its state in the loop over the read conditions.

In addition to what is described above in connection with FIGS. 4 and 5, the following action is also performed:

For every cell pair that does not show any or any suitable switching difference in the readout loop or which has an unstable behavior:

a. Option 1: store masking information chip-internally or externally to exclude the bit pair (memory cell pair) from key (re-)generation. It may also be possible to directly exclude the memory cell pair from the generation of the readout pattern.

b. Option 2: (explicitly) write both bits of the bit pair and thus remove them completely from the weakly erased distribution, so that they do not switch at all in the read loop and thus can be excluded from key (re-)generation. In other words, both memory cells of the memory cell pair are (explicitly) written, for example to the binary value "one". The evaluator 130 may note that this particular memory cell pair has not yet provided valid memory cell order information when the loop over the read conditions is terminated and all different read conditions have been tried out. Accordingly, the evaluator 130 may exclude the memory cell pair on the basis of this finding from PUF generation and/or readout pattern generation.

Figure 6:
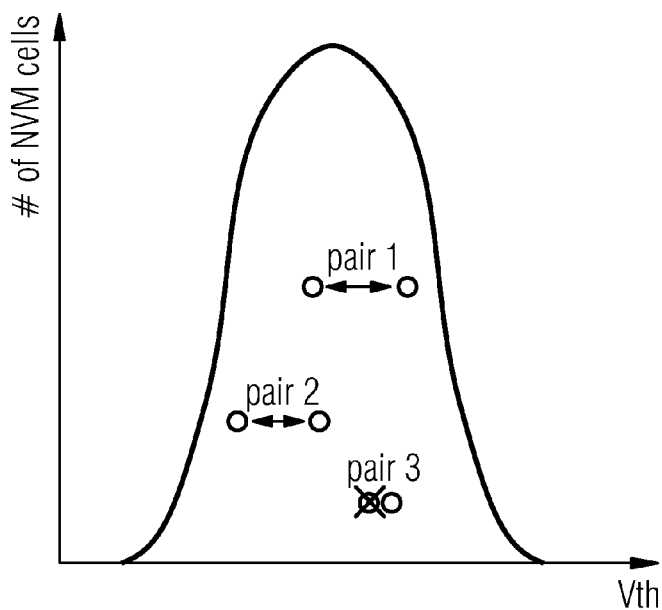
FIG. 6 is similar to FIG. 5 and additionally illustrates the masking of a given memory cell pair in which the memory cell outputs are too similar to each other.

FIG. 6 schematically illustrates option 1 and shows the cell state distribution after (weak) erase. Pair 3 is masked out because the difference of the memory readout values of the first and second memory cells is too small. As mentioned above, the masking information may be stored chip-internally or externally.

Figure 7:
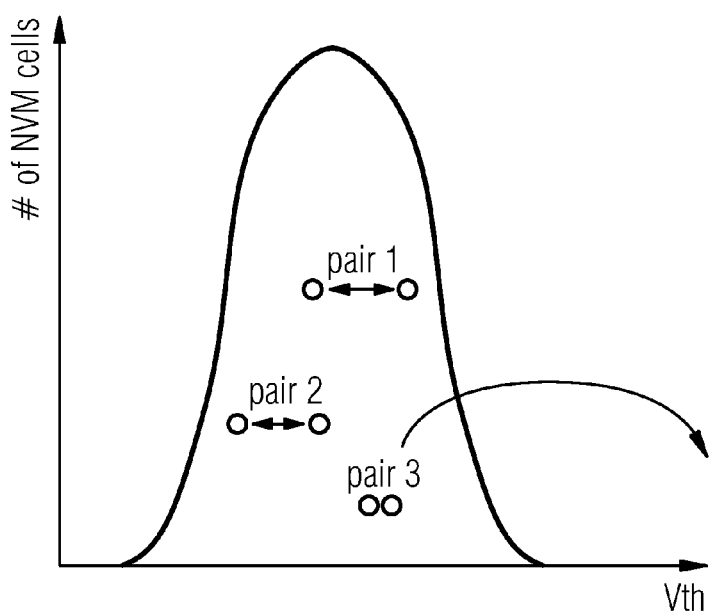
FIG. 7 is similar to FIG. 5 and additionally illustrates an explicit writing of both cells of a memory cell pair that are too similar in their output values and therefore not reliably exploitable for PUF generation.

FIG. 7 illustrates the cell state distribution after (weak) erase and for different cell pairs: pair 3 is written and removed from (weakly) erased distribution because the difference is too small between the memory readout values of the first and second memory cells. The action of explicitly writing the two memory cells of the memory cell pair 3 is schematically illustrated in FIG. 7 by an arrow that brings pair 3 to the right, i.e., to a relatively high threshold voltage Vth which is typically not considered within the loop of predetermined read conditions.

During the verification phase, the following actions are performed every time the key has to be (re-)generated:

In a loop try out different predetermined read conditions in an "increasing order" (or "decreasing order"), and for every bitline determine the one of the two NVM cells connected to the same bitline that switches earlier, i.e. earlier changes its state in the loop over the read conditions.

Option 1: Exclude all bit pairs from key (re-)generation as indicated by stored masking information Option 2: Exclude all bit pairs from key (re-)generation where no bit flips at all (Re-)generate the key from the result.

With the proposed masking or explicit writing of memory cell pairs that do not have a suitable difference in the memory readout values of their corresponding memory cells, again only a small range of NVM cells is necessary. The software effort for generation of PUF bits is still relatively small and simple, however, it is higher than in the embodiments described above in connection with FIGS. 1 to 5.

As in the embodiments described in connection with FIGS. 4 and 5, taking the "difference" between two cells at the same bitline strongly reduces otherwise relatively high error rates since the following effects are substantially automatically cancelled out:

Temperature variation effects (identical temperature of both cells).

Degradation over time, e.g., due to disturbances (seen in the same way by both cells).

Changes of the content over other NVM cells connected to the same bitlines like the NVM cells reserved for PUF (seen in the same way by both cells).

Influence of sense amplifier offsets (since identical sense amplifier is used to read both cells).

Cell pairs where both cells are not different enough are masked.

Compared to the embodiments described in connection with FIGS. 4 and 5, an even lower effort for error correction can be expected with the embodiments described in connection with FIGS. 6 and 7.

Further embodiments propose to additionally mask out cell pairs that show a change behavior at different temperature(s) and/or now show no or no suitable difference in the read loop at additional temperature(s). This may be performed once as a preparation of the PUF area, for example during the enrollment phase. Note that each electronic device has to be evaluated at different temperatures and for each electronic device 100 the results obtained for a first temperature need to be temporarily stored until the electronic device 100 has been tested under the additional temperature(s), in order to identify and exclude those memory cell pairs that have an unpredictable or non-exploitable behavior at different temperatures. For example, another portion of the NVM that is not used for PUF generation may be used during the enrollment phase, since it typically does not yet contain the payload data at this time. Once the tests at different temperatures have been performed and the chip-individual PUF key has been determined, the payload data can be encrypted with this chip-individual PUF key and then stored in encrypted form in a portion of the NVM that is not used for PUF generation.

During the verification phase, the electronic device may be used in substantially the same manner as described above in connection with FIGS. 6 and 7.

Again, only a small range of NVM cells is necessary. The software effort for generation of PUF bits is still relatively small and simple, but more than in the embodiments described in connection with FIGS. 1 to 7. During the enrollment phase, for every electronic device a relatively large amount of data has to be handled and temporarily stored until the electronic device 100 has been tested under all desired temperatures.

In addition to the memory cell pairs that could be identified and masked out or explicitly written mentioned above in connection with FIGS. 6 and 7, also memory cell pairs that show unwanted behavior over temperature are now masked out or explicitly written.

All in all, this results in a relatively low effort for error correction. Among the embodiments described up to this point in connection with FIGS. 1 to 7, the lowest effort for error correction may probably be expected for the embodiments that also take into account unwanted behavior over temperature.

The evaluator may be further configured to determine a selected read condition of the different read conditions that are provided by the memory control 120 to the non-volatile memory 110, wherein with the selected read condition a number of a plurality of memory cell pairs 412a to 412n have a first value that is closest to a predetermined number. In this manner, a substantially well balanced distribution of zeros and ones within the readout pattern can be achieved. The selected read condition may be determined during the enrollment phase. The memory controller 120 may also be configured to store the selected read condition, either chip-internally or externally. During the verification phase(s) the selected read condition may then be retrieved and again used by the memory controller 120 to reproduce the read condition(s) that was/were used during the enrollment phase when the reference readout pattern was generated.

The electronic device may comprise a memory for a selected read condition which is selected during an enrollment phase from at least the first read condition and the second read condition. The selected read condition is retrieved from the memory and used during a verification phase when generating a physically unclonable function response on the basis of the readout pattern provided by the evaluator 130.

FIG. 8 shows a schematic flow diagram of a method for generating a physically unclonable function response (PUF response) of an electronic device. The method comprises a step 802 of applying a weak erase condition to at least a portion of a non-volatile memory (NVM) so that memory cells of at least the portion of the non-volatile memory are erased to different internal states depending on different physical properties of the memory cells. Typically, step 802 is performed in enrollment, only. The method further comprises a step 804 of applying a read condition to at least the portion of the non-volatile memory. Then, as indicated at step 806, the different internal states of the memory cells are read out to provide a readout pattern. At a step 808, the physically unclonable function response of the electronic device is determined on the basis of the readout pattern. As indicated by the dashed arrow in FIG. 8, typically the steps 804, 806, and 808 are repeated during the verification phase each time the PUF has to be regenerated.

Prior to applying the weak erase condition to at least the portion of the non-volatile memory, the method may further comprise a step of applying a write condition to at least the portion of the non-volatile memory. Furthermore, the memory cells of at least the portion of the non-volatile memory may then be written with a write value so that prior to the weak erase condition, the memory cells within at least the portion of the non-volatile memory are brought into a defined initial state.

The non-volatile memory may comprise a first memory section and a second memory section. A first memory cell within the first memory section and a second memory cell within the second memory section form a memory cell pair. In this case, the method may further comprise a step of varying the read condition applied to at least the portion of the non-volatile memory, and determining which memory cell of the memory cell pair exhibits a different memory readout value between a first read condition and a second read condition (while the other memory cell does not exhibit a different memory readout value). The readout pattern may then be determined on the basis of a corresponding result of said determining. In particular, it may be determined which of the first and second memory cells in the memory cell pair changes its memory readout value when passing from the first read condition to the second read condition: if the first memory cell changes its memory readout value, the result for the memory cell pair has a first value (e.g., binary "zero") and if the second memory cell changes its memory readout value, the result of the memory cell pair has a second value (e.g., binary "one").

The variation of the read condition may comprise varying the read condition in a monotone sense from one iteration to a subsequent iteration over at least three iterations. The method may further comprise a step of determining which memory cell of the memory cell pair changes its memory readout value at an earlier iteration than the other memory cell to obtain a corresponding memory cell order information. The method may also comprise a step of determining the readout pattern on the basis of the memory cell order information. Typically, a plurality of memory cell pairs are considered for determining the readout pattern so that these steps may be performed substantially concurrently for the plurality of memory cell pairs.

The method may further comprise, typically for each memory cell pair, a step of determining whether the memory cell pair does or does not exhibit a sufficiently different behavior regarding the memory readout values of its first and second memory cells. To this end, the difference of the memory readout values of the first and second memory cells may be compared with a threshold and the memory cell pair may be determined to not exhibit the sufficiently different behavior if the difference is smaller than said threshold. The memory cell pair may then be excluded from consideration for the readout pattern of the memory cell pair and does not exhibit the sufficiently different behavior. The corresponding masking information may then be stored during an enrollment phase of PUF handling. During a subsequent verification phase of the PUF handling, the masking information may be retrieved again and the memory cell pair may be excluded (again) from consideration for the readout pattern if the masking information indicates this.

The method may also comprise a determination of whether the memory cell pair does not exhibit a sufficiently different behavior regarding the memory readout values of its first and second memory cells after the weak erase condition. The memory cell pair may then be explicitly written with an identical memory value so that none of the memory cells of the memory cell pair exhibits a different memory readout value between the first read condition and the second read condition. In this manner, the memory cell pair can in this case be excluded from a readout pattern generation.

It is also possible to explicitly write at least a portion of the non-volatile memory prior to applying the weak erase condition. In this manner, the portion of the NVM is in a defined initial state when the weak erase condition is subsequently applied. Consequently, an influence of existing data in the portion of the NVM is reduced, as the action of explicitly writing is typically performed during the enrollment phase and also during each verification phase.

During an enrollment phase of a physically unclonable function application, it may be determined how many memory cell pairs have a first value for each one of the different read conditions provided to the non-volatile memory. The method may then comprise a step of determining for which read condition of the different read conditions the number of memory cell pairs having the first value is closest to a predetermined number of memory cell pairs (e.g., 50% of the memory cell pairs have the value "1"). The read condition determined in this manner is regarded as a "selected read condition", which may then be stored for use during a verification phase in the future.

The method may also comprise a step of selecting and storing a selected read condition from at least the first read condition and the second read condition during an enrollment phase of a physically unclonable function application. During a verification phase of the physically unclonable function application, the selected read condition may be retrieved and used for generating the physically unclonable function response which is typically similar to the reference physically unclonable function response obtained during the enrollment phase but nevertheless almost never completely identical.

It is also possible to perform an error correction on the physically unclonable function response and/or on the readout pattern in accordance with an error correcting code. In particular, it is possible to determine redundancy information for the error correcting code during the enrollment phase of the physically unclonable function application. The redundancy information may then be stored (on-chip or on another storage medium) still during the enrollment phase. During the verification phase of the physically unclonable function application, the previously stored redundancy information may be retrieved again and used for correcting errors in a physically unclonable function response determined during the verification phase.

FIG. 9 shows a schematic block diagram of an electronic device with PUF functionality according to further embodiments. The non-volatile memory 110 comprises a plurality of pages (page 1, page 2, page 3 . . . ). Each page comprises a plurality of memory cells. For example, page 1 comprises memory cells 112a to 112n. Memory cell 112a on page 1 is connected to a bitline 113a. This bitline 113a is also connected to memory cells in the remaining pages of the non-volatile memory 110. The bitline 113a leads to a sense amplifier 180a which is part of a plurality of sense amplifiers 180a to 180n. Also, the other memory cells 112b, 112c, . . . , 112n are connected to bitlines 113b, 113c, . . . , 113n and, in this manner, to the corresponding sense amplifiers 180b, 180c, . . . , 180n. The memory controller 120 is configured to provide the control signals for the memory cells 112a to 112n and optionally also to the plurality of sense amplifiers 180a to 180n, as indicated by the dashed line. In this manner, the memory controller 120 is also configured to influence operating settings of the sense amplifiers 180a to 180n, such as supply voltage, bias voltage, threshold voltage or supply/bias/threshold currents, as part of the read conditions. Then the memory controller 120 may vary in order to set the memory cells 112a to 112n and their corresponding sense amplifiers 180a to 180n to an operating range in which the randomness of the physical properties of the memory cells 112a to 112n becomes apparent.

FIG. 10 shows a schematic block diagram of an electronic device according to further embodiments in which the randomly distributed physical properties of the sense amplifiers 180a to 180n are used for generating readout patterns that may be used to determine device-specific PUF responses. In particular, the electronic device 1000 comprises a plurality of sense amplifiers 180a to 180n configured to read out a plurality of memory cells (not illustrated in FIG. 10) by comparing a cell signal output by one of the plurality of memory cells with a reference signal. The plurality of memory cells may typically be arranged in a memory cell array.

The electronic device 1000 further comprises a reference signal generator 170 configured to generate the reference signal, and a reference signal duplicator 1090 configured to provide a duplicate reference signal. Furthermore, the electronic device 1000 comprises a plurality of input selectors 1060a, 1060b, 1060c, . . . , 1060n configured to selectively apply one of the cell signal and the duplicate reference signal to the plurality of sense amplifiers 180a to 180n for comparison with the reference signal. During normal operation, i.e., when stored data is read out from the memory cell array, the cell signals (cell signal a . . . , cell signal n) provided by the memory cell array are paired with the reference signal by the plurality of sense amplifiers 180a to 180n and depending on the content of the memory cell that currently is connected to the corresponding sense amplifier, the output of the sense amplifier assumes a particular value (typically "zero" or "one" in the case of binary data stored within the memory cells). This is provided to a buffer that is configured for receiving the readout pattern 140. During this normal operation of the memory, the readout pattern corresponds to the content of one memory page. Besides this normal operation, the plurality of sense amplifiers 180a to 180n may also be used to generate a readout pattern for subsequent PUF response generation. The PUF response is typically unique for the electronic device 1000 and can be used to identify a particular specimen of the electronic device 1000. As mentioned above, the reason for this uniqueness is that the physical properties of the sense amplifiers 180a to 180n differ from chip to chip even though substantially identical manufacturing conditions were used. Hence, the randomness among the different sense amplifiers 180a to 180n becomes apparent when the sense amplifiers are operated within their tolerance region, which is avoided during normal operation. In the context of PUF response generation, the comparison of the duplicate reference signal of the reference signal by the plurality of sense amplifiers 180a to 180n produces a physically unclonable function response of the electronic device 1000. The physically unclonable function response reflects in particular offset differences of the plurality of sense amplifiers.

It can be seen that only little additional hardware is required, namely the reference signal duplicator 1090 and the plurality of input selectors 1060a to 1060n.

If the sense amplifiers 180a to 180n are set into their tripping point, the small random offset differences determine the sense amplifier output. The tripping point is set when the cell current and the reference current are equal. Since the cell current cannot reliably be influenced, a small hardware addition is required for this embodiment, which on demand substitutes the cell current with another copy of the reference current. The readout of the sense amplifiers 180a to 180n directly returns a number of PUF bits or bits of an intermediate readout pattern that will be further processed to provide the PUF bits or that may be directly used as the PUF bits. Again, a masking-out of instable bits is possible, as in the embodiments that use random variations of the physical properties of the memory cells 120a to 120n described above in connection with FIGS. 6 and 7.

The number of bits is limited by the number of sense amplifiers. On the other hand, the PUF response generation is independent of the memory cells. In particular, no memory cells have to be reserved for the PUF response generation but the entire storage capacity of the memory cell array can be used. The software can also be kept relatively simple.

The cell signal may be a cell current and the reference signal may be a reference current. The reference signal duplicator 1090 may be a current mirror. Each sense amplifier 180a to 180n can be configured to output a binary output signal as a function of the cell current being greater than the reference current or vice versa (cell current greater than reference current: "0"; cell current smaller than reference current: "1").

The electronic device 1000 may further comprise an evaluator configured to identify sense amplifiers that have an unstable output when comparing the reference current and the duplicate reference current. A masking information memory may also be provided which is configured to store a corresponding masking information produced by the evaluator so that sense amplifiers that have been identified as having an unstable output when comparing the reference current and the duplicate reference current are excluded from consideration for the physically unclonable function response.

FIG. 11 shows a schematic flow diagram of a method for generating a PUF response on the basis of differences in the physical properties of the sense amplifiers 180a to 180n. The method comprises a step 1102 of generating a reference signal for a plurality of sense amplifiers that are configured to read out a plurality of memory cells. The reference signal may than be duplicated to obtain a duplicate reference signal as indicated at a step 1104. The method further comprises step 1106 of applying the reference signal to reference signal inputs of the plurality of sense amplifiers. The duplicate reference signal is applied to cell signal inputs of the plurality of sense amplifiers. The cell signal inputs of the plurality of sense amplifiers 180a to 180n are normally (during normal operation as a memory) used to connect the memory cells of a memory cell array to the sense amplifiers. When the electronic device 1000 is in a mode for PUF response generation, a plurality of input selectors are controlled in a manner that, instead of the cell signals, the duplicate reference signal is provided to the plurality of sense amplifiers. The plurality of sense amplifiers then generates respective output signals as a function of different offset differences of the sense amplifiers. These offset differences are typically randomly distributed within a tolerance region of the sense amplifiers and for this reason suitable for being used in connection with PUF response generation. At a step 1108 of the method, the physically unclonable function response is determined using the respective output signals of the plurality of sense amplifiers 180*a* to 180*n*.

Note that the embodiment described in connection with FIGS. 10 and 11 does not necessarily depend on the presence of a non-volatile memory but may be implemented with other types of memory as well that use sense amplifiers.

Embodiments that comprise a non-volatile memory described in connection with FIGS. 1 to 9, for example, may use any type of non-volatile memory such as HS3P, UCP, ETOX, MRAM, PCRAM, RRAM.

For embodiments that use the different physical properties of paired memory cells, the use of pages that both have either an odd address or an even address may be considered for forming the memory cell pairs. This measure may reduce systematic layout dependencies, i.e., in general pages with non-mirrored layouts.

Another possible option is to use other schemes that use more than two NVM cells in a "pair" or "group" that are connected to the same bitline. It may even be possible to use schemes that use two or more NVM cells in a "pair" or "group" that are not connected to the same bitline.

Different read conditions may be set by variation of read voltage and/or reference current.

Physically unclonable functions based on NVMs may be of interest for inclusion in electronic devices that also have NVM on the chip, e.g. in FPGAs, since the effort for PUF key regeneration is expected to be much smaller for NVMs compared to SRAMs.

FIGS. 12A and 12B show a table that contains a small fraction of the results of an evaluation of NVM cell pairs as described in connection with FIGS. 4 to 7. FIG. 12A shows the difference of the electric currents of the first memory cell and the second memory cell within a memory cell pair. Each memory cell pair is connected to a common bitline and the first memory cell belongs to a first memory page and the second memory cell belongs to a second memory page. The first and second memory pages form a page pair. Of these page pairs, the differences of the electrical currents are provided for 18 page pairs, namely page pair 1 to page pair 18. FIG. 12B is substantially identical to FIG. 12A, however, for 17 more page pairs, namely page pair 19 to page pair 35. The tables in FIGS. 12A and 12B only show the results for bitlines 2188 to 2208, wherein the total number of bitlines is 2208. In horizontal direction, an extract of the results of the 35 different page pairs are listed. Those differences of the electric currents that are at least 10 µA in the one or the other direction are marked by dashed and dotted boxes, respectively. To give an example, the memory cell pair on bitline 2197 from page pair 6 has a current difference of 17 µA.

In the lower part of FIGS. 12A and 12B, a statistical analysis of the results for the different page pairs is provided. A first statistical analysis has been done for the 10 µA difference and beneath a further statistical analysis has been performed for a 15 µA difference. The statistical analysis may be interpreted as follows. Take for example the statistical analysis for 10 µA and page pair 1: of the 2208 memory cell pairs, 534 (=24%) have an absolute difference of at least 10 µA, wherein 47% have a positive difference and 53% have a negative difference. Applying the condition that reliably evaluable memory cells have to differ by at least 10 µA from each other after a preceding weak erase state and when the selected read condition is applied to the memory cells, page pair 1 is capable of generating a PUF with a maximum of 534 bits which would then contain 47% ones and 53% zeros. The numbers in the box to the left of the statistical analysis for 10 µA are the averages over all page pairs. Accordingly, on average 464 (=21%) evaluable bits are provided per page pair that exhibit a zero/one distribution of 50% to 50%.

Since the 10 µA differences should lead to a reliable evaluation of the PUFs, this measurement shows that on average 464 reliable PUF bits can be extracted from one page pair.

FIG. 13 shows the different behavior of sense amplifiers on two different chips but at the same position. In particular, the median threshold voltage Vth is illustrated for different sense amplifiers SA00 to SA34. The diagram shows that there are significant chip-to-chip differences between chip 1 and chip 2 that may be exploited as a basis for PUF generation.

Furthermore, the diagram in FIG. 13 also shows that at different operating conditions for the plurality of sense amplifiers SA00 to SA34, the sense amplifiers on one chip (e.g., chip 1) react in the same manner as can be observed by comparing the dashed line for an operating condition of 5 µA and the dotted line for an operating condition of 6 µA: They are mostly similar with except for an offset.

Figure 14:
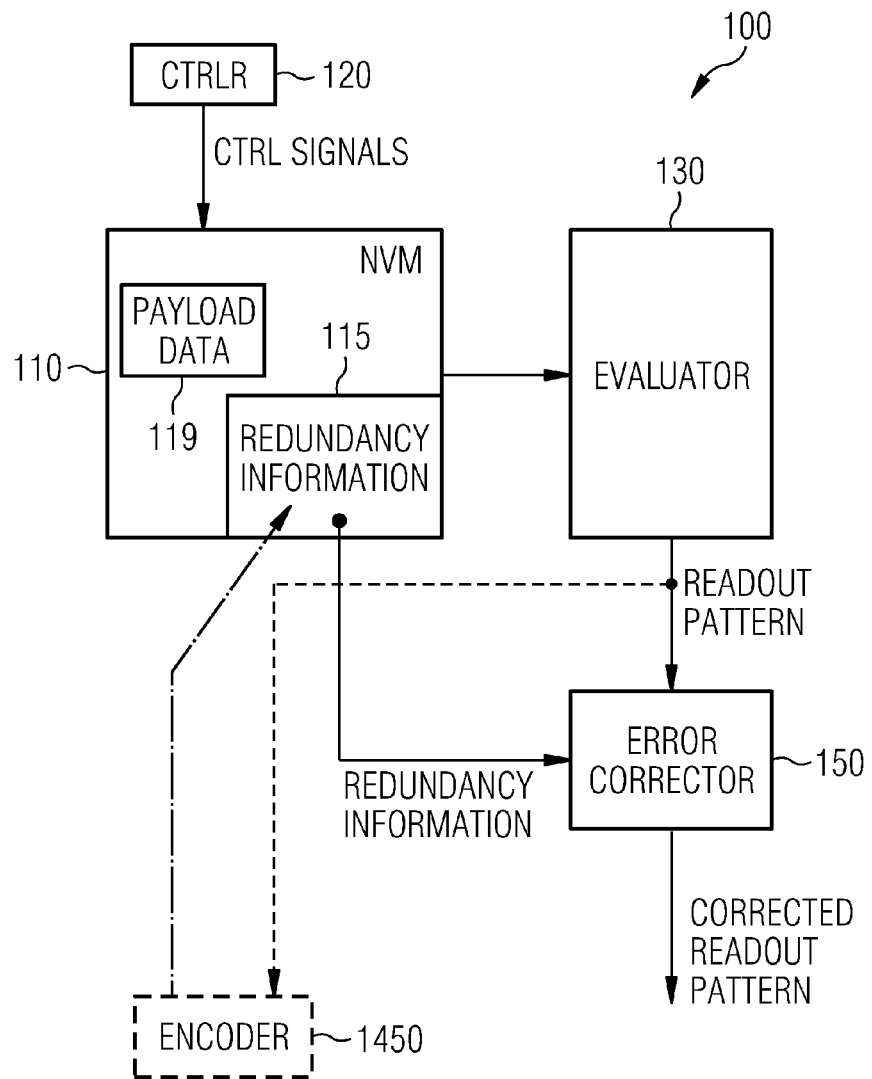
FIG. 14 shows a schematic block diagram of an electronic device comprising an error corrector for correcting the readout pattern using redundancy information.

FIG. 14 shows a schematic block diagram of an electronic device 100 according to further embodiments. In addition to the components that are shown, for example, in FIG. 1, the electronic device 100 further comprises an error corrector 150. Further, a portion of the non-volatile memory 110 is dedicated to storing redundancy information. During the enrollment phase, the readout pattern may be provided from the evaluator 130 to an encoder 1450. The encoder 1450 may be a component of the electronic device 100 or it could be provided externally because the encoder 1450 is typically needed during the enrollment phase, only. As an alternative, the error corrector 150 may also provide the functionality of the encoder 1450. The role of the encoder 1450 is to determine the redundancy information on the basis of the reference readout pattern that is provided by the evaluator 130 during the enrollment phase and that is to be stored in the dedicated section 115 of the non-volatile memory 110. In an alternative, the redundancy information may also be stored in another memory or even provided to a user of the electronic device 100 via a completely different channel, for example a printed product key which has to be entered by the user via a keyboard, or via a communication channel. In most cases, however, the redundancy information is probably stored on-chip for fast and easy access during the verification phases.

During a verification phase, the evaluator 130 provides a readout pattern which is similar to the reference readout pattern of the enrollment phase, yet typically not 100% identical. If this readout pattern is intended to be used for decrypting payload data that is stored in a further section 119 of the non-volatile memory 110, the decryption is typically bound to fail if the key used for decrypting the payload data differs from the key used for encrypting the payload data (i.e., the reference readout pattern or a key derived from the reference readout pattern). Asymmetric encryption may be used as well but also in this case the decryption key (secret key) must correspond to the encryption key (public key). The error corrector 150 is now configured to use the redundancy information for correcting possible errors within the readout pattern. An error in the readout pattern is defined as a difference between the readout pattern determined during the verification phase and the reference readout pattern determined during the enrollment phase. In particular, a combination of the reference readout pattern and the redundancy information forms a codeword of an error correcting code implemented by the error corrector 150. If the readout pattern does not contain too many errors, the error corrector 150 is typically capable of correcting these errors and to output a corrected readout pattern that is equal to the reference readout pattern.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, some one or more of the most important method steps may be executed by such an apparatus.

Depending on certain implementation requirements, embodiments of the invention can be implemented in hardware or in software. The implementation can be performed using a digital storage medium, for example a floppy disk, a DVD, a Blue-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitionary.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods may be performed by any hardware apparatus.

The above described embodiments are merely illustrative for the principles of the present invention. It is understood that modifications and variations of the arrangements and the details described herein will be apparent to others skilled in the art. It is the intent, therefore, to be limited only by the scope of the impending patent claims and not by the specific details presented by way of description and explanation of the embodiments herein.

Although each claim only refers back to one single claim, the disclosure also covers any conceivable combination of claims.

What is claimed is:

1. An electronic device comprising:
   a non-volatile memory comprising a plurality of memory cells;
   a memory controller configured to provide control signals to the non-volatile memory causing the non-volatile memory, or a selected memory section of the non-volatile memory, to be in one of a read state and a weak erase state, wherein the weak erase state causes the plurality of memory cells to maintain different states depending on different physical properties of the plurality of memory cells; and
   an evaluator configured to read out the plurality of memory cells and to provide a readout pattern during the read state, wherein the readout pattern that is provided after a preceding weak erase state corresponds to a physically unclonable function response of the electronic device uniquely identifying the electronic device.

2. The electronic device according to claim 1, wherein the control signals provided by the memory controller are further configured to control the non-volatile memory or the selected memory portion to be in a write state.

3. The electronic device according to claim 1, wherein the non-volatile memory comprises a first memory section and a second memory section, wherein a first memory cell within the first memory section and a second memory cell within the second memory section form a memory cell pair, wherein the memory controller is further configured to vary the control signals for the non-volatile memory during the read state to provide different read conditions for the non-volatile memory, and wherein the evaluator is further configured to determine which memory cell of the memory cell pair exhibits a different memory readout value between a first read condition and a second read condition and to determine the readout pattern based thereon.

4. The electronic device according to claim 3, wherein the first memory cell and the second memory cell are connected to an identical bitline of the non-volatile memory.

5. The electronic device according to claim 3, wherein the first memory cell and the second memory cell have identical layout and identical orientation.

6. The electronic device according to claim 3, wherein the memory controller is further configured to perform a plurality of iterations to vary the control signals for the non-volatile memory during the read state, wherein the read conditions are varied in a monotone sense from one iteration to a subsequent iteration, and wherein the evaluator is further configured to determine which memory cell of the memory cell pair changes its memory readout value at an earlier iteration than the other memory cell to obtain a corresponding memory cell order information, and further configured to determine the readout pattern on the basis of the memory cell order information.

7. The electronic device according to claim 3, wherein the evaluator is further configured:
to determine whether the memory cell pair does not exhibit a sufficiently different behavior regarding their memory readout values;
to exclude the memory cell pair from consideration for the readout pattern if the memory cell pair does not exhibit the sufficiently different behavior;
to store a corresponding masking information during an enrollment phase;
to retrieve the masking information during a subsequent verification phase; and
to again exclude the memory cell pair from consideration for the readout pattern during the verification phase if the masking information indicates so.

8. The electronic device according to claim 3, wherein the control signal provided by the memory controller is further configured to control the non-volatile memory or the selected memory portion to be in a write state, and wherein the evaluator is further configured to determine whether the memory cell pair does not exhibit a sufficiently different behavior regarding their memory readout values after the weak erase state, and to explicitly write the memory cell pair with an identical memory value so that none of the memory cells of the memory cell pair exhibits a different memory readout value between the first read condition and the second read condition so that the memory cell pair can in this case be excluded from a readout pattern generation.

9. The electronic device according to claim 3, wherein the evaluator is further configured to determine a selected read condition of the different read conditions that are provided by the memory controller to the non-volatile memory, wherein with the selected read condition a number of a plurality of memory cell pairs have a first value that is closest to a predetermined number, and wherein the memory controller is further configured to store the selected read condition.

10. The electronic device according to claim 3, further comprising a memory for a selected read condition which is selected during an enrollment phase from at least the first read condition and the second read condition, and which is retrieved from the memory and used during a verification phase when generating a physically unclonable function response.

11. The electronic device according to claim 1, further comprising an error corrector for correcting the readout pattern according to an error correcting code.

12. An electronic device comprising:
a plurality of sense amplifiers configured to read out a plurality of memory cells by comparing a cell signal output by one of the plurality of memory cells with a reference signal;
a reference signal generator configured to generate the reference signal;
a reference signal duplicator configured to provide a duplicate reference signal; and
a plurality of input selectors configured to selectively apply one of the cell signal and the duplicate reference signal to the plurality of sense amplifiers for comparison with the reference signal, wherein the comparison of the duplicate reference signal with the reference signal by the plurality of sense amplifiers produces a physically unclonable function response of the electronic device, the physically unclonable function response reflecting offset differences of the plurality of sense amplifiers.

13. The electronic device according to claim 12, wherein the cell signal is a cell current and the reference signal is a reference current.

14. The electronic device according to claim 13, wherein the sense amplifier is configured to output a binary output signal as a function of the cell current being greater than the reference current.

15. The electronic device according to claim 12, further comprising:
an evaluator configured to identify sense amplifiers that have an instable output when comparing the reference current and the duplicate reference current; and
a masking information memory configured to store a corresponding masking information produced by the evaluator so that sense amplifiers that have been identified as having an instable output when comparing the reference current and the duplicate reference current are excluded from consideration for the physically unclonable function response.

16. The electronic device according to claim 12, further comprising an error corrector for correcting the readout pattern according to an error correcting code.

17. The electronic device according to claim 16, further comprising a redundancy memory for storing redundancy information for the error correcting code, wherein a combination of a reference readout pattern and the redundancy information forms a code word of the error correcting code.

18. An electronic device comprising:
means for storing data;
means for controlling an operating state of the means for storing data, wherein the means for storing data provides at least a read state and a weak erase state, wherein the weak erase state causes the means for storing data to maintain an internal state that is within a tolerance region of a characteristic internal state of the means for storing data; and
means for reading out the internal state of the means for storing data, and to output a physically unclonable function response on the basis of the internal state.

19. A method for generating a physically unclonable function response of an electronic device, the method comprising:
applying a weak erase condition to at least a portion of a non-volatile memory so that memory cells of at least the portion of the non-volatile memory are erased to different internal states depending on different physical properties of the memory cells;
applying a read condition to at least the portion of the non-volatile memory;

reading out the different internal states of the memory cells to provide a readout pattern; and determining the physically unclonable function response of the electronic device on the basis of the readout pattern.

20. The method according to claim 19, further comprising, prior to applying the weak erase condition:
applying a write condition to at least the portion of the non-volatile memory; and
writing the memory cells of at least the portion of the non-volatile memory with a write value.

21. The method according to claim 19, wherein the non-volatile memory comprises a first memory section and a second memory section, wherein a first memory cell within the first memory section and a second memory cell within the second memory section form a memory cell pair, and wherein the method further comprises:
varying the read condition applied to at least the portion of the non-volatile memory; and
determining which memory cell of the memory cell pair exhibits a different memory readout value between a first read condition and a second read condition, wherein the readout pattern is determined on the basis of a corresponding result of said determining.

22. The method according to claim 21,
wherein varying the read condition comprises varying the read condition in a monotone sense from one iteration to a subsequent iteration; and
wherein the method further comprises:
determining which memory cell of the memory cell pair changes its memory readout value at an earlier iteration than the other memory cell to obtain a corresponding memory cell order information; and
determining the readout pattern on the basis of the memory cell order information.

23. The method according to claim 21, further comprising:
determining whether the memory cell pair does not exhibit a sufficiently different behavior regarding the memory readout values of its first and second memory cells;
excluding the memory cell pair from consideration for the readout pattern of the memory cell pair that does not exhibit the sufficiently different behavior;
storing the corresponding masking information during an enrollment phase;
retrieving the masking information during a subsequent verification phase; and
excluding the memory cell pair from consideration for the readout pattern if the masking information indicates so.

24. The method according to claim 21, further comprising:
determining whether the memory cell pair does not exhibit a sufficiently different behavior regarding the memory readout values of its first and second memory cells after the weak erase condition;
explicitly writing the memory cell pair with an identical memory value so that none of the memory cells of the memory cell pair exhibits a different memory readout value between the first read condition and the second read condition so that the memory cell pair can in this case be excluded from a readout pattern generation.

25. The method according to claim 19, further comprising explicitly writing at least a portion of the non-volatile memory prior to applying the weak erase condition so that a portion of the non-volatile memory is in a defined state prior to applying the weak erase condition.

26. The method according to claim 21, further comprising, during an enrollment phase of a physically unclonable function application:
determining how many memory cell pairs have a first value for each one of the different read conditions provided to the non-volatile memory;
determining for which read condition of the different read conditions the number of memory cell pairs having the first value is closest to a predetermined number of memory cell pairs, wherein the determined read condition is called a selected read condition; and
storing the selected read condition for use during a verification phase.

27. The method according to claim 21, further comprising:
selecting and storing a selected read condition from at least the first read condition and the second read condition during an enrollment phase of a physically unclonable function application; and
retrieving and using the selected read condition during a verification phase of the physically unclonable function application for generating the physically unclonable function response.

28. The method according to claim 19, further comprising performing an error correction on the physically unclonable function response in accordance with an error correcting code.

29. The method according to claim 28, further comprising:
determining redundancy information for the error correcting code during an enrollment phase of a physically unclonable function application;
storing the redundancy information during the enrollment phase;
retrieving the redundancy information during a verification phase of the physically unclonable function application; and
using the redundancy information for correcting errors in a physically unclonable function response determined during the verification phase.

30. A method for generating a physically unclonable function response of an electronic device, the method comprising:
generating a reference signal for a plurality of sense amplifiers configured to read out a plurality of memory cells;
duplicating the reference signal to obtain a duplicate reference signal;
applying the reference signal to reference signal inputs of the plurality of sense amplifiers, and applying the duplicate reference signal to cell signal inputs of the plurality of sense amplifiers, wherein the plurality of sense amplifiers generate respective output signals as a function of different offset differences of the sense amplifiers; and
determining the physically unclonable function response using the respective output signals.

31. The method according to claim 30, wherein the reference signal is a reference current and a cell signal provided by a memory cell to a corresponding sense amplifier is a cell current.

* * * * *

UNITED STATES PATENT AND TRADEMARK OFFICE
CERTIFICATE OF CORRECTION

PATENT NO. : 9,093,128 B2  Page 1 of 1
APPLICATION NO. : 13/668963
DATED : July 28, 2015
INVENTOR(S) : J. Otterstedt et al.

It is certified that error appears in the above-identified patent and that said Letters Patent is hereby corrected as shown below:

In the Claims

Columns 21, 22 (claim 25, lines 62, 1) please change "so that a the portion" to -- so that a portion --

Signed and Sealed this
Ninth Day of February, 2016

Michelle K. Lee
*Director of the United States Patent and Trademark Office*